United States Patent
Erdmann et al.

(10) Patent No.: US 10,372,348 B2
(45) Date of Patent: *Aug. 6, 2019

(54) GENERATING NODE ACCESS INFORMATION FOR A TRANSACTION ACCESSING NODES OF A DATA SET INDEX

(71) Applicant: INTERNATIONAL BUSINESS MACHINES CORPORATION, Armonk, NY (US)

(72) Inventors: Derek L. Erdmann, Tucson, AZ (US); David C. Reed, Tucson, AZ (US); Thomas C. Reed, Tucson, AZ (US); Max D. Smith, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/110,976

(22) Filed: Aug. 23, 2018

(65) Prior Publication Data
US 2018/0364923 A1    Dec. 20, 2018

Related U.S. Application Data

(63) Continuation of application No. 15/236,388, filed on Aug. 12, 2016, now Pat. No. 10,114,559.

(51) Int. Cl.
*G06F 3/06* (2006.01)
*G06F 9/46* (2006.01)

(52) U.S. Cl.
CPC ............ *G06F 3/0613* (2013.01); *G06F 3/061* (2013.01); *G06F 3/067* (2013.01); *G06F 3/0631* (2013.01); *G06F 3/0638* (2013.01); *G06F 9/466* (2013.01)

(58) Field of Classification Search
USPC ........................................................ 711/170
See application file for complete search history.

(56) References Cited

U.S. PATENT DOCUMENTS 6,249,792 B1 *  6/2001  Zwilling ........... G06F 17/30115
8,412,688 B1     4/2013  Armangau et al.
(Continued)

OTHER PUBLICATIONS

U.S. Appl. No. 15/236,388, filed Aug. 12, 2016.
(Continued)

*Primary Examiner* — Mano Padmanabhan
*Assistant Examiner* — Jean C Edouard
(74) *Attorney, Agent, or Firm* — David W. Victor; Konrad Raynes Davda & Victor LLP

(57) ABSTRACT

Provided are a computer program product, system, and method for generating node access information for a transaction accessing nodes of a data set index. Pages in the memory are allocated to internal nodes and leaf nodes of a tree data structure representing all or a portion of a data set index for the data set. A transaction is processed with respect to the data set that involves accessing the internal and leaf nodes in the tree data structure, wherein the transaction comprises a read or write operation. Node access information is generated in transaction information, for accessed nodes comprising nodes in the tree data structure accessed as part of processing the transaction. The node access information includes a pointer to the page allocated to the accessed node prior to the transaction in response to the node being modified during the transaction.

20 Claims, 8 Drawing Sheets

(56) References Cited

U.S. PATENT DOCUMENTS

| | | | |
|---|---|---|---|
| 8,745,005 B1 * | 6/2014 | DeSouter | G06F 11/1471 707/648 |
| 9,262,463 B2 | 2/2016 | Helak et al. | |
| 9,305,112 B2 | 4/2016 | Erdmann et al. | |
| 2006/0026188 A1 | 2/2006 | Najork et al. | |
| 2006/0101081 A1 * | 5/2006 | Lin | G06F 17/30362 |
| 2006/0173885 A1 | 8/2006 | Moir et al. | |
| 2006/0179086 A1 * | 8/2006 | Najork | G06F 17/30961 |
| 2009/0254594 A1 | 10/2009 | Burchall | |
| 2010/0211737 A1 * | 8/2010 | Flynn | G06F 3/0616 711/114 |
| 2010/0306222 A1 | 12/2010 | Freedman et al. | |
| 2011/0035359 A1 * | 2/2011 | Bendakovsky | G06F 11/1458 707/640 |
| 2011/0145201 A1 | 6/2011 | Holst et al. | |
| 2011/0153979 A1 * | 6/2011 | Boyle | G06F 17/30327 711/209 |
| 2011/0289263 A1 | 11/2011 | McWilliams et al. | |
| 2011/0320496 A1 | 12/2011 | Reid et al. | |
| 2012/0011106 A1 * | 1/2012 | Reid | G06F 9/466 707/695 |
| 2013/0013890 A1 | 1/2013 | Manner et al. | |
| 2013/0138896 A1 | 5/2013 | McKenney | |
| 2013/0238576 A1 | 9/2013 | Binkert et al. | |
| 2013/0318126 A1 * | 11/2013 | Graefe | G06F 17/30327 707/797 |
| 2014/0082316 A1 * | 3/2014 | Erdmann | G06F 17/30961 711/170 |
| 2014/0108463 A1 * | 4/2014 | Gagliardi | G06F 11/3495 707/797 |
| 2015/0193487 A1 * | 7/2015 | Demidov | G06F 17/30327 707/756 |
| 2015/0370860 A1 * | 12/2015 | Bender | G06F 17/30306 707/609 |
| 2018/0046387 A1 | 2/2018 | Erdmann et al. | |

OTHER PUBLICATIONS

Office Action dated Feb. 8, 2018, pp. 25, for U.S. Appl. No. 15/276,484.

Response dated May 8, 2018, pp. 9, to Office Action dated Feb. 8, 2018, pp. 25, for U.S. Appl. No. 15/276,484.

Notice of Allowance dated Jun. 21, 2018, pp. 9.

List of IBM Patents or Patent Applications Treated as Related, dated Aug. 23, 2018, pp. 2.

* cited by examiner

Internal Node

Leaf Node

Transaction Information

Node Access Information

GENERATING NODE ACCESS INFORMATION FOR A TRANSACTION ACCESSING NODES OF A DATA SET INDEX

BACKGROUND OF THE INVENTION

1. Field of the Invention

The present invention relates to a computer program product, system, and method for generating node access information for a transaction accessing nodes of a data set index.

2. Description of the Related Art

A partitioned data set extended (PDSE) is a data set having an index and zero or more members. When adding new data for a new or existing member, the new data is appended sequentially to the end of the PDSE.

The PDSE index may be implemented in a tree data structure where pages allocated to the PDSE data sets are assigned to implement internal nodes and leaf nodes representing the data set index. Each leaf node represents one of the members and provides information on the member that may be used to access the member. Each internal node has one or more child leaf nodes. When a user seeks to access a member, the member name is presented and the tree is traversed to the internal node and leaf node representing the requested member using the member name as the index key. Member data is only loaded into the memory when accessed.

There is a need in the art for improved techniques for managing pages in memory implementing leaf and internal nodes of a data set index.

SUMMARY

Provided are a computer program product, system, and method for generating node access information for a transaction accessing nodes of a data set index. Pages in the memory are allocated to internal nodes and leaf nodes of a tree data structure representing all or a portion of a data set index for the data set, wherein the leaf nodes identify data set members and the internal nodes are used to traverse the tree data structure to access the leaf nodes. A transaction is processed with respect to the data set that involves accessing the internal and leaf nodes in the tree data structure, wherein the transaction comprises a read or write operation. Node access information is generated in transaction information, for accessed nodes comprising nodes in the tree data structure accessed as part of processing the transaction, wherein the node access information includes a pointer to the page allocated to the accessed node prior to the transaction in response to the node being modified during the transaction.

DETAILED DESCRIPTION

A challenge with PDSE data sets is the lack of structure and transparency of the page buffering system. PDSE index page buffering is a non-deterministic system in which a pool of buffered pages represents the current valid set of pages for the particular PDSE address space but without any relational or temporal referencing. This lack of temporal and relational referencing impedes diagnosis of index problems and the reconstruction of the history of a particular index page in the buffer.

Described embodiments provide techniques to address the lack of temporal referencing and history information for data sets, such as PDSE data sets, having indexes represented in a tree data structure with nodes. When processing a transaction with respect to a data set that involves accessing a plurality of the nodes in the tree data structure, transaction information is generated that includes node access information for accessed nodes comprising nodes in the tree data structure accessed as part of processing the transaction. The node access information includes a pointer to the page allocated to the accessed node prior to the transaction in response to the node being modified during the transaction. The node access information for an accessed node may be generated when the accessed node is accessed as part of processing the transaction so that the transaction information logs node access information for all node processing from when the transaction is opened until the transaction is closed. The gathered transaction information including information on each node of a tree index accessed while processing a transaction allows for rolling back a transaction and performance analysis at the buffer level for data sets.

Figure 1:
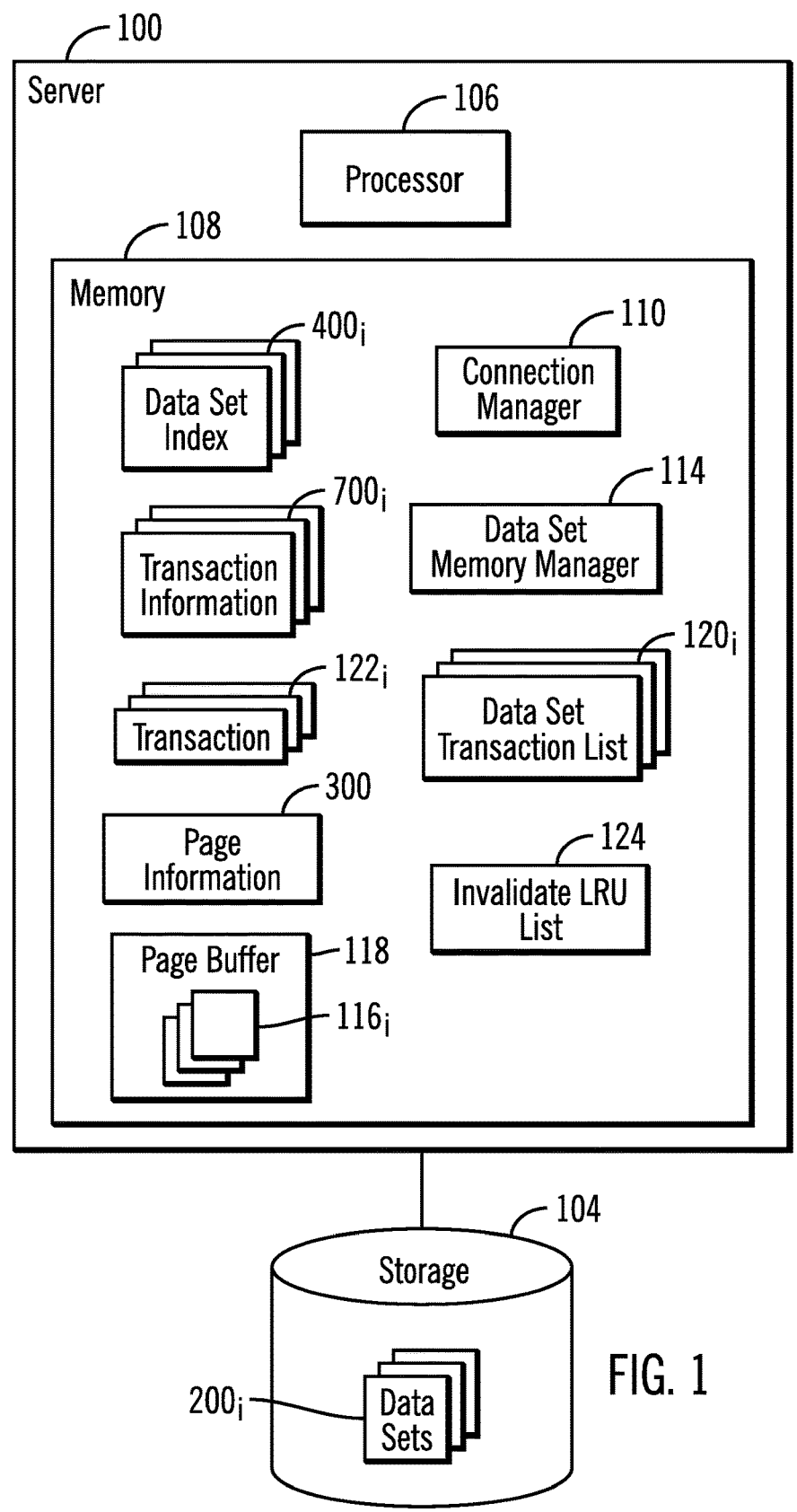
FIG. 1 illustrates an embodiment a computing environment.

FIG. 1 illustrates an embodiment of a computing environment. A plurality of hosts (not shown) may submit read and write requests to a server 100 to access data in data sets 200 in a storage 104. The server 100 includes a processor 106 and a memory 108 having a connection manager program 110 to manage read and write access to the data sets 200$_i$. The connection manager 110 may load data set indexes 400 into the memory for the data sets 102 that are opened for access. A data set memory manager 114 manages the use of pages 116$_i$ of data in a page buffer 118 in the memory 108 that are allocated to the connection manager 110 for data set operations. A specific number of pages 116$_i$ in a page buffer 118 may be allocated for data set operations. The pages 116$_i$ allocated for data sets remain allocated to a data set even if not used. If additional pages 116 are needed, the data set memory manager 114 may request additional pages to be allocated for data set operations. A page 116$_i$ may comprise a fixed sized page allocated to store the data set indexes 400 and data set members. The data set memory manager 114 maintains page information 300 having information on pages 116$_i$ allocated to data sets.

The data set memory manager 114 may further maintain data set transaction lists 120$_i$, one for each data set 200$_i$, identifying transaction information instances 700$_i$, one for each transaction 122$_i$ executed against one of the data sets 200$_i$. The transaction information instance 700$_i$ provides information on the transaction 122$_i$ operations with respect to accessing the nodes of the data set index 400 during execution of the transaction 122$_i$. An invalidate least recently used (LRU) list 124 identifies pages 116 to invalidate, such as pages having been deallocated and available for use.

In one embodiment, the memory 108 may comprise a volatile or non-volatile storage, such as a Dynamic Random Access Memory (DRAM), flash memory, Random Access Memory (RAM) or a non-volatile memory, e.g., battery backed-up Random Access Memory (RAM), static RAM (SRAM), storage-class memory (SCM), etc., Phase Change Memory (PCM), resistive random access memory (RRAM), spin transfer torque memory (STM-RAM), conductive bridging RAM (CBRAM), etc.

The storage 104 may comprise a non-volatile storage, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. The data sets 200$_i$ may further be configured from an array of devices, such as Just a Bunch of Disks (JBOD), Direct Access Storage Device (DASD), Redundant Array of Independent Disks (RAID) array, virtualization device, etc.

The connection manager 110 and data set memory manager 114 may comprise one or more programs loaded into the memory 108 that are executed by the processor 106 or may be implemented in one or more hardware devices in the server 100, such as in Application Specific Integrated Circuits (ASIC).

Figure 2:
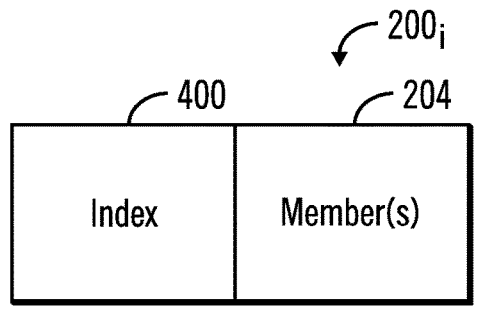
FIG. 2 illustrates an embodiment of a data set.

FIG. 2 illustrates an embodiment of an instance of a data set 200$_i$, which includes an index 400 used to access members 204 of the data set 200$_i$. A member 204 comprises a range or extents of tracks. In certain embodiments, the data sets 200$_i$ may comprise a Partitioned Data Set Extended (PDSE), where new data is written to the end of the data set and old versions of members are reused or deleted. In alternative embodiments, the data sets 200$_i$ may comprise a type of data set other than a PDSE.

Figure 3:
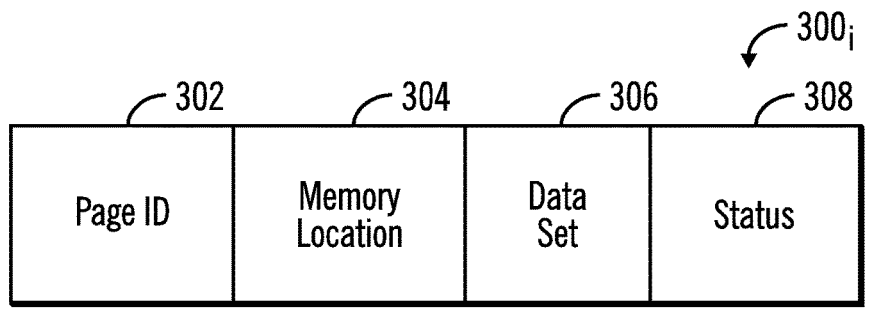
FIG. 3 illustrates an embodiment of page information providing information on a page implementing a node of the data set index.

FIG. 3 illustrates an embodiment of page information 300$_i$ the data set memory manager 114 uses to manage the pages 116$_i$ allocated for data sets 200$_i$. The page information 300$_i$ for each page 116$_i$ indicates a page identifier (ID) 302; a memory location 304 in the memory 108 of the page 302; a data set 306 for which the page 300$_i$ is allocated; and a status 308 indicating whether the page 302 is freed or available, allocated to a node or member of a data set 200$_i$.

Figure 4:
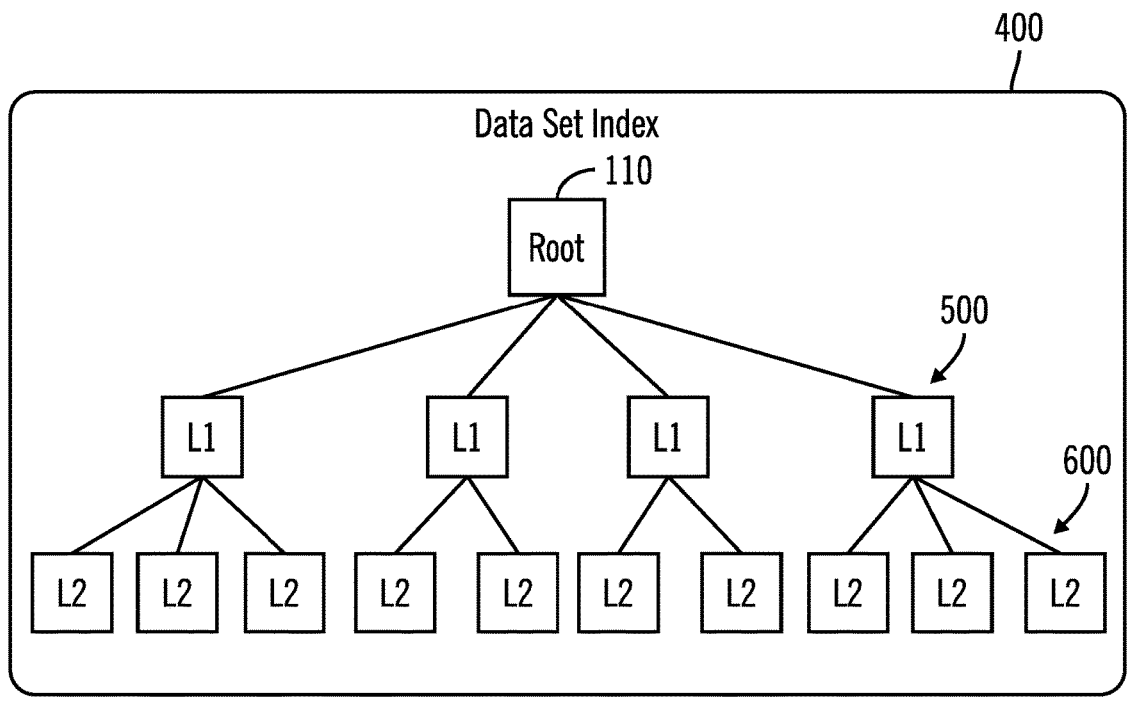
FIG. 4 illustrates an embodiment of a data set index having a tree data structure.

FIG. 4 illustrates an implementation of the data set index 400 as a tree data structure having internal nodes 500 (also known as non-leaf nodes) and leaf nodes 600. There may be one page 116$_i$ in the memory 108 allocated to each node, leaf and internal. Each leaf node 600$_i$ may provide information on one or more members 204 of a data set 200$_i$ used to access the members 204. The internal nodes 500 include one or more keys and links to one or more leaf nodes 600. The keys of the internal nodes 500 are used to traverse the tree structure representing the data set memory index 400 to access the leaf nodes 600 having the information on data set members 204. The keys in the internal nodes 500 used to access the leaf nodes 600 may comprise characters or character strings for member 204 names. Alternatively, the keys may comprise other values used to access leaf nodes 600 for members 204 being accessed.

Figure 5:
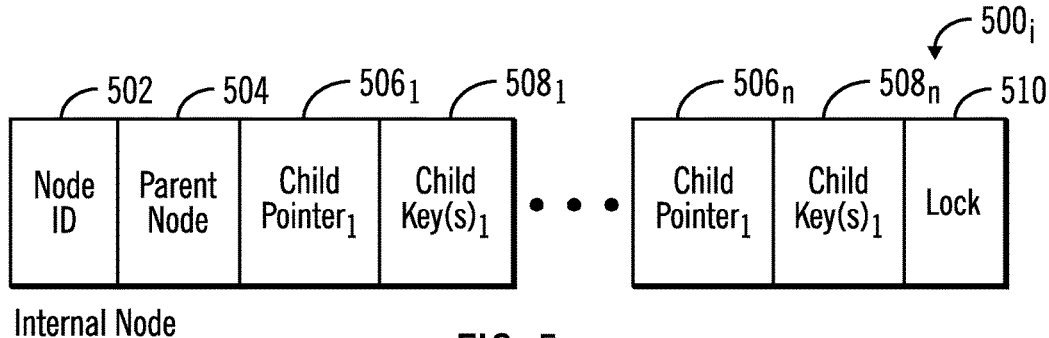
FIG. 5 illustrates an embodiment of internal node information maintained in a page implementing an internal node.

FIG. 5 illustrates an embodiment of information in a data structure maintained for an instance of an internal node 500$_i$, which may be implemented as a page 116$_i$ in the memory 108, including a node identifier (ID) 502; a parent node 504 in the tree data structure index 400 comprising the root node or another internal node; for each of the one or more child nodes of the node 502, a child pointer 506$_1$ ... 506$n$ pointing to the child node of the internal node 502 and child keys 508$_1$ ... 508$_n$ used to determine the child node pointer to select at the internal node 502 to traverse; and a lock 510 indicating a type of lock, if any, set for the node 502.

Figure 6:
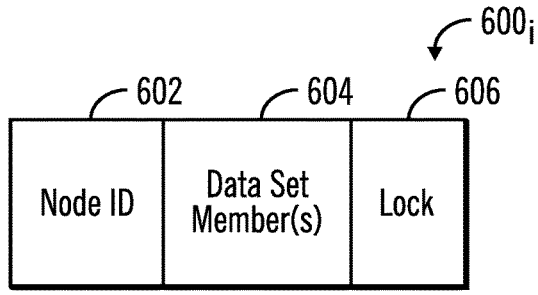
FIG. 6 illustrates an embodiment of leaf node information maintained in the page implementing a leaf node.

FIG. 6 illustrates an embodiment of an instance of a leaf node 600$_i$, which may be implemented as a page 116$_i$ in the memory 108, including a node ID 602 identifying the leaf node; one or more data set member descriptors 604 identifying data set members 204 assigned to the leaf node 602 if any; and a lock 606 indicating a type of lock, if any, set for the leaf node 602.

In one embodiment, the members 204 may have member names used to index the members 204 in the tree structure. For instance, the internal nodes 500 may have keys related to characters in a member name that are used to determine a link to the appropriate leaf node page 600 based on the member name when searched. An internal node 500$_i$ may have a number of child leaf nodes that is one greater than the number of member name keys maintained in the internal node to index the child leaf nodes.

Figure 7:
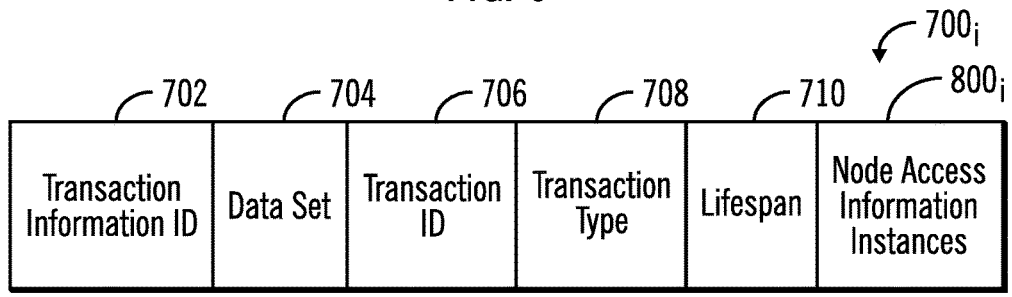
FIG. 7 illustrates an embodiment of transaction information for a transaction opened on a data set.

FIG. 7 illustrates an embodiment of an instance of transaction information 700$_i$ maintained for one transaction, and includes: a transaction information identifier (ID) 702; a data set 704 to which the transaction 702 is directed; a transaction identifier (ID) 706 of the transaction; a transaction type 708, such as a read or write operation; a lifespan 710 indicating a duration since the transaction information 702 was created; and one or more node access information instances 800$_i$ providing information on each index node 500$_i$, 600$_i$ accessed during operations implementing the transaction 702.

Figure 8:
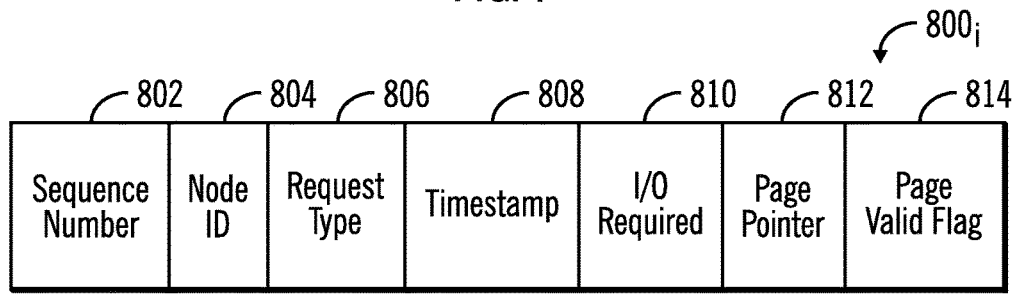
FIG. 8 illustrates an embodiment of node access information for transaction information for a transaction accessing the nodes of a data set index.

FIG. 8 illustrates an embodiment of an instance of node access information 800$_i$ providing information on each node access that occurs during execution of a transaction 122$_i$, including a sequence number 802 of access of the node 804 to indicate the order in which the current node access occurs; a node ID 804 identifying the node in the data set index being accessed; a request type 806 of the access, such as read or write/modify at the node 804; a timestamp 808 at which the node 804 was accessed; an I/O required indicator 810, which indicates whether the page allocated to the node 804 had to be staged from the storage 104 to the page buffer 118; a page pointer 812 pointing to a previous page allocated to the node 804 that was deallocated if the node was modified; and a page valid flag 814 indicating whether the deallocated page addressed by the pointer 812 is still valid in the page buffer 118 or has been invalidated and freed for allocation to another node or member. In certain embodiments, if the node 804 has not had a page modified and deallocated or the page addressed by the pointer 812 has been invalidated, then the page pointer 812 may have a null value.

Additional flags and information may be provided for the information described with respect to FIGS. 2, 3, and 5-8.

Figure 9:
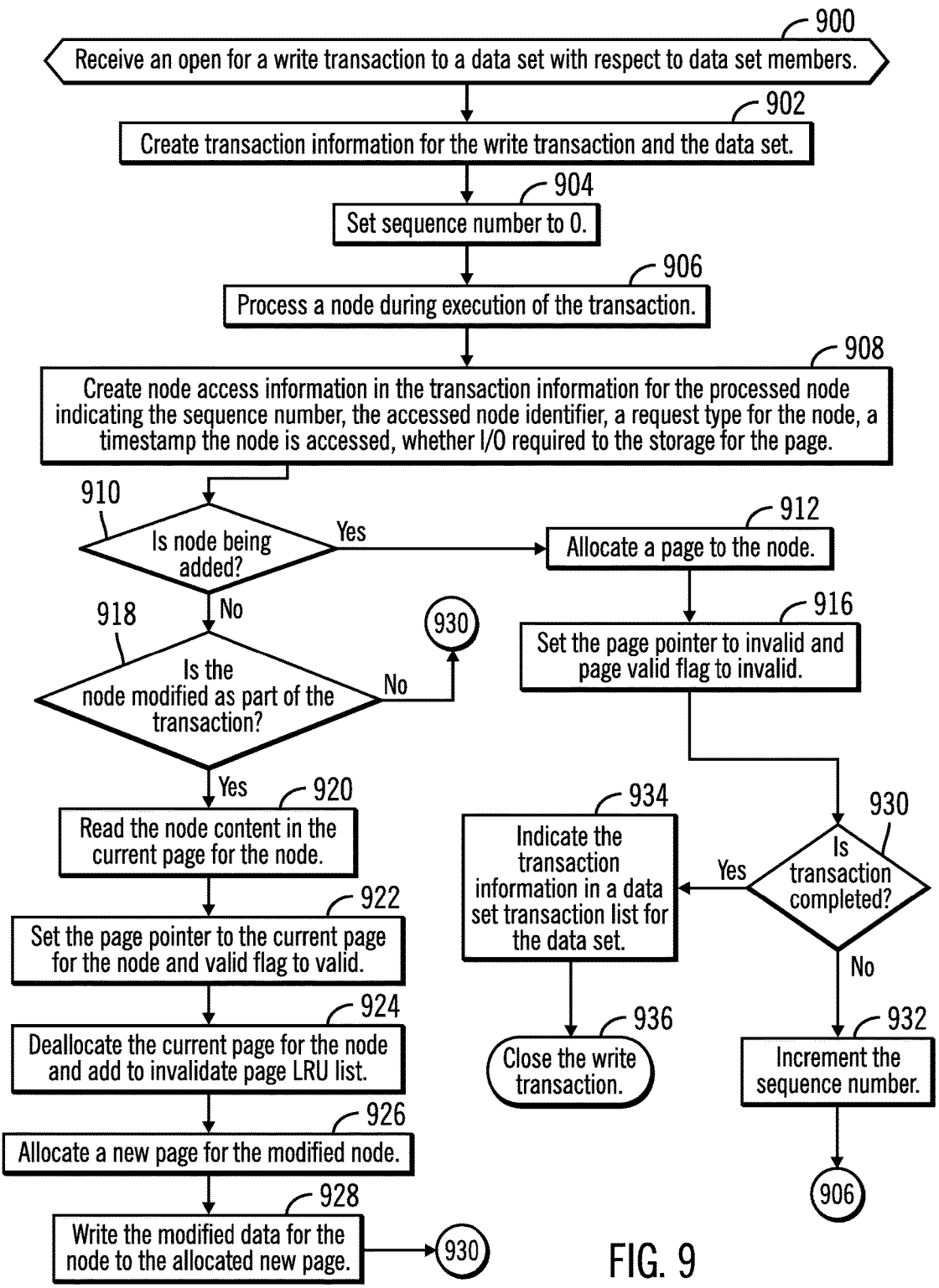
FIG. 9 illustrates an embodiment of operations to open and process a write transaction to a data set.

FIG. 9 illustrates an embodiment of operations performed by the data set memory manager 114 when a write transaction $122_w$ is executed to generate node access information $800_i$ for transaction information $700_i$ for the write transaction $122_W$ being executed. Upon receiving (at block 900) an open for a write transaction $122_W$ to a data set $200_i$ with respect to data set members 204, the data set memory manager 114 creates (at block 902) transaction information $700_i$ for the write transaction $122_w$ and sets (at block 904) a sequence number (s) to zero. Upon processing (at block 906) a node in the data set index 400 tree for the data set to which the transaction $122_i$ is directed, the data set memory manager 114 creates (at block 908) node access information $900_S$, where s is the sequence number, in the transaction information $700_i$ for the processed node indicating the sequence number 802; the node identifier 804 of the accessed node; a request type 806 for the node access, i.e., read or modified (added, deleted, or updated); a timestamp 808 the node is processed; and whether I/O required 810 to the storage 104 to retrieve the page $116_i$ implementing the accessed node.

If (at block 910) the processed node is being added, then the data set memory manager 114 allocates (at block 912) a page $116_i$ to the internal $500i$ or leaf $600i$ node being added and sets (at block 916) the page pointer 812 to invalid and the page valid flag 814 to indicate invalid, i.e., the page pointer 812 for the previous page for the node does not point to a valid page 116. If (at block 910) the processed node is not being added and if (at block 918) the accessed node is modified as part of executing the transaction $122_w$, then the node content in the current page $116_c$ for the node is read (at block 920). The page pointer 812 is set (at block 922) to the current page $116_c$ for the node and the current page 116 is deallocated (at block 924) and added to the invalidate LRU list 124. A separate process of the data set memory manager 114 processes pages on the invalidate LRU list 124 to invalidate and free pages in the LRU list 124 to make available for use for nodes or members for a data set. A new page $116_N$ for the modified node is allocated (at block 926) and the modified data for the node, including the read data for the node with the modifications from the transaction $122_w$, is Written (at Block 928) to the allocated new page $116_N$.

After completing the write (at block 928) or if the node is not modified (from the no branch of block 918) or after setting the page pointer to invalid (at block 916), control proceeds to block 930. If (at block 930) the write transaction $122_w$ is not Completed, then the sequence number (s) is incremented (at block 932) and control proceeds to block 906 to process a next node during execution of the write transaction $122_W$. If (at block 930) the transaction $122_W$ is completed, then the transaction information $700_i$ is indicated (at block 934) in a data set transaction list $120_i$ for the data set $200_i$ subject to the processed write transaction $122_W$ and the write transaction $122_W$ is closed (at block 936).

Figure 10:
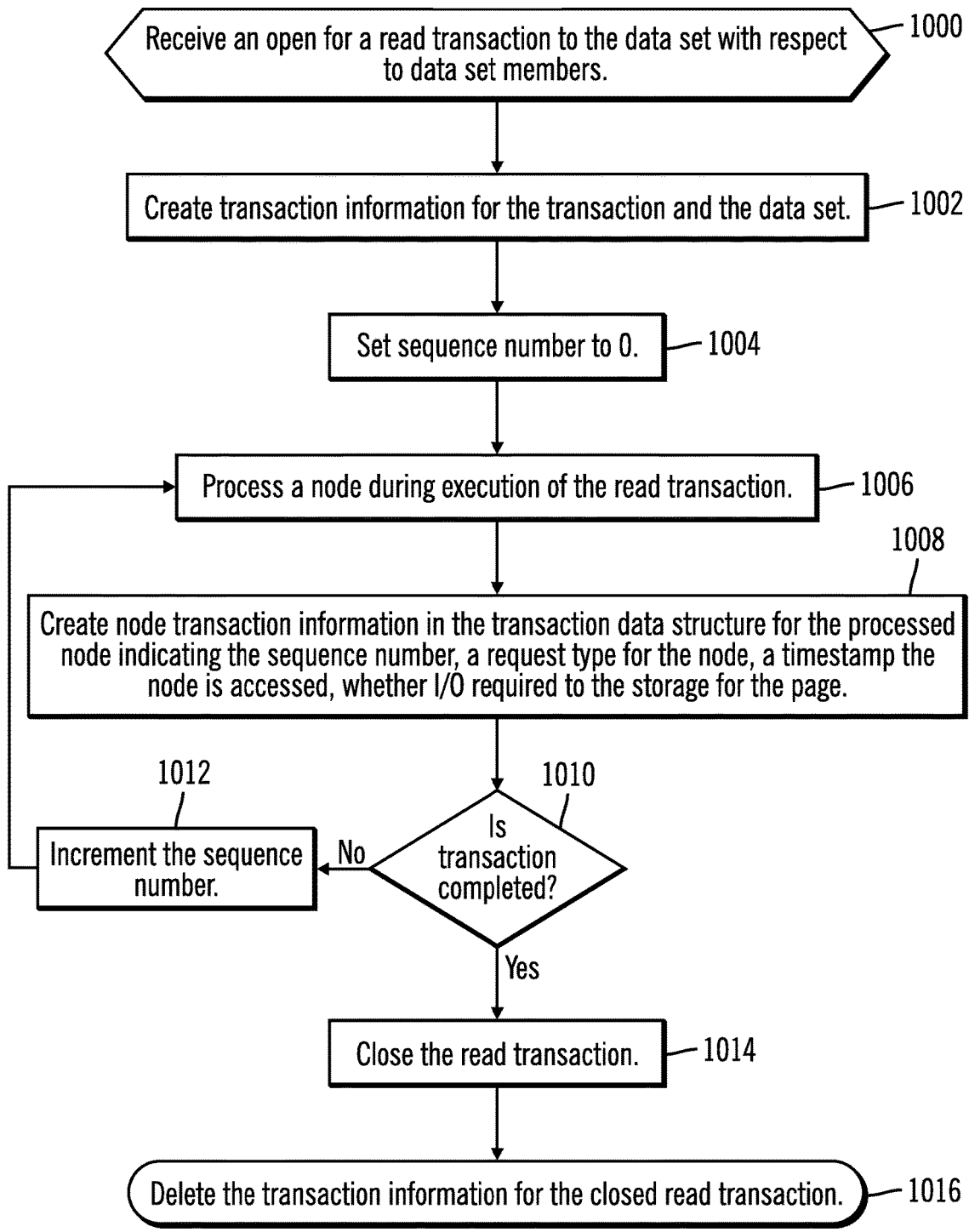
FIG. 10 illustrates an embodiment of operations to open and process a read transaction to a data set.

FIG. 10 illustrates an embodiment of operations performed by the data set memory manager 114 when a read transaction $122_R$ is executed to generate node access information $800_i$ for transaction information $700_i$ for the read transaction $122_R$ being executed. Upon receiving (at block 1000) an open for a read transaction $122_R$ to a data set with respect to data set members 204, the data set memory manager 114 creates (at block 1002) transaction information $700_i$ for the read transaction $122_R$ and sets (at block 1004) a sequence number (s) to zero. Upon processing (at block 1006) a node in the data set index 400 tree for the data set to which the read transaction $122_R$ is directed, the data set memory manager 114 creates (at block 1008) node access information $800_S$, where s is the sequence number, in the transaction information $700_i$ for the processed node indicating the sequence number 802; the node identifier 804 of the accessed node; a read request type for the node access; a timestamp 808 the node is processed; and whether I/O is required 810 to the storage 104 to retrieve the page $116_S$ implementing the accessed node to retrieve the page implementing the node.

After completing the processing of the node, if (at block 1010) the read transaction $122_R$ is not completed, then the sequence number is incremented (at block 1012) and control proceeds to block 1006 to process a next node during execution of the read transaction $122_R$. If (at block 1010) the read transaction $122_R$ is completed, then read transaction $122_R$ is closed (at block 1014) and the transaction information $700_i$ generated for the closed read transaction $700_i$ is deleted (at block 1016).

With the operations of FIGS. 9 and 10, simultaneously when processing a node in a data set index during execution of a write or read transaction, node access information $800_i$ is created for transaction information $700_i$ for the transaction $122_i$ being executed to provide information on operations performed at the nodes during execution of the transaction $_{122i}$. Further, with write transactions, the page deallocated from a node when modifying the node and writing to a new page is indicated in a pointer 812 in the node access information $800_i$ to provide the previous state for the node after modifying a node.

Figure 11:
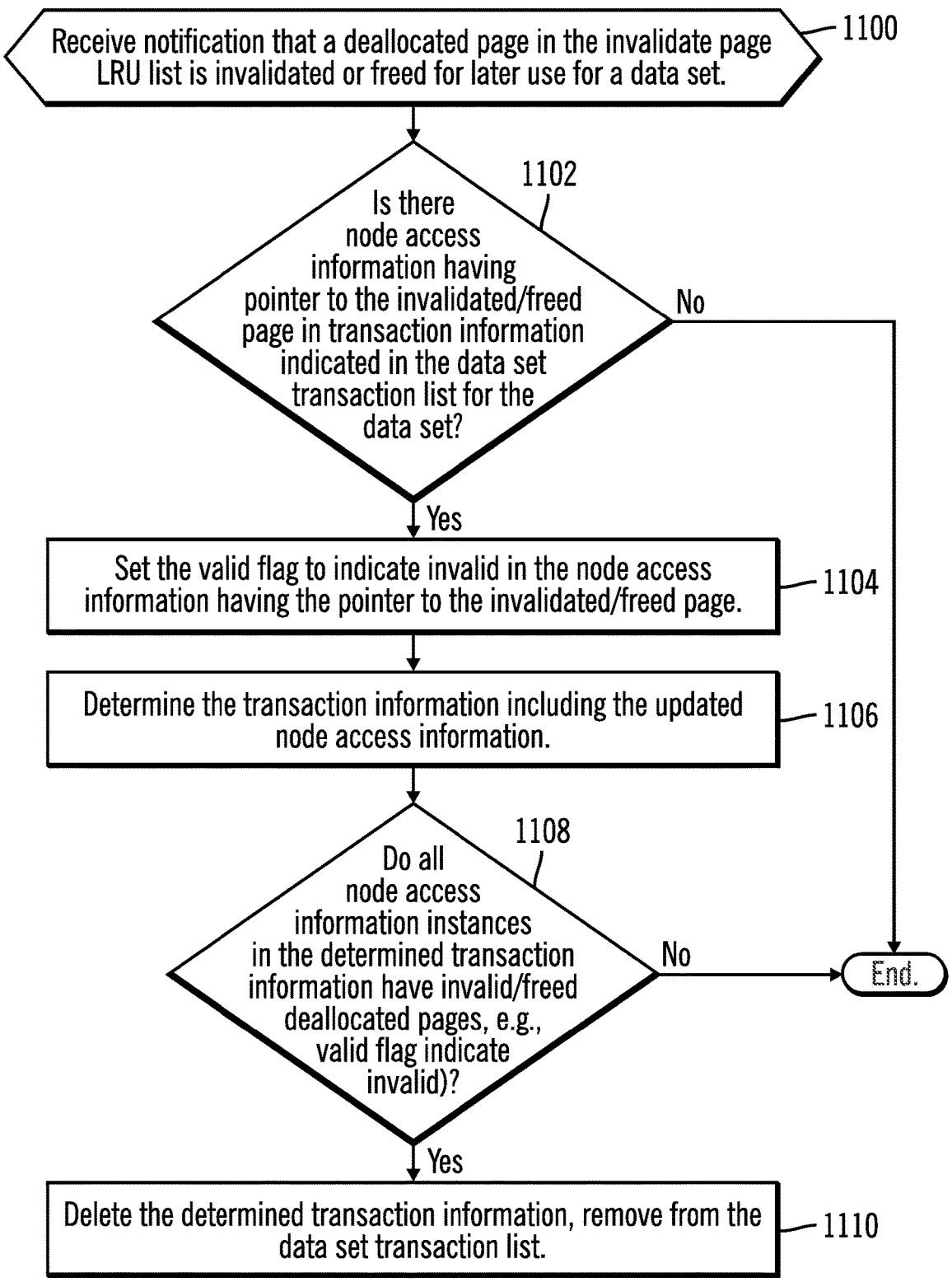
FIG. 11 illustrates an embodiment of operations to process notification of invalidating/freeing a page.

FIG. 11 illustrates an embodiment of operations performed by the data set memory manager 114 when a deallocated page from a node is invalidated or freed to be available for subsequent use for a node or member. Upon receiving (at block 1100) notification that a deallocated page $116_I$ in the invalidate page LRU list 124 is invalidated or freed for later use, the data set memory manager 114 determines (at block 1102) whether there is node access information $800_i$ having a pointer to the invalid/freed page $116_I$ in one transaction information instance $700_i$ indicated in the data transaction list $120_i$ for the data set $200_i$. If (at block 1102) one of the node access information instances $800_i$ points to the invalidated/freed page $116_I$, then the page valid flag 814 is set (at block 1106) in that instance $800_i$ to indicate invalid. If (at block 1108) all the previous deallocated pages identified by pointers 812 in all the node access information instances $800_i$ for the determined transaction information $700_i$ are invalid, i.e., the page valid flag 814 for all the node access information instances $800_i$ is invalid, then the determined transaction information $700_i$ is deleted and removed (at block 1110) from the data set transaction list $120_i$. If (at block 1108) there are some node access information instances $800_i$ still having valid deallocated pages for the transaction, then control ends.

With the described embodiments of FIG. 11, the transaction information $700_i$ for a write transaction is deleted when all the deallocated pages identified by pointers 812 in the node access information $800_i$ are invalidated. In a further embodiment, the transaction information $700_i$ for a write transaction $122_i$ may be deleted when the lifespan 710 of the transaction information $700_i$ exceeds a threshold lifespan. In a yet further embodiment, transaction information $700_i$ may be deleted if space used by transaction information $700_i$ for different write transactions exceeds a storage threshold for transaction information.

Figure 12:
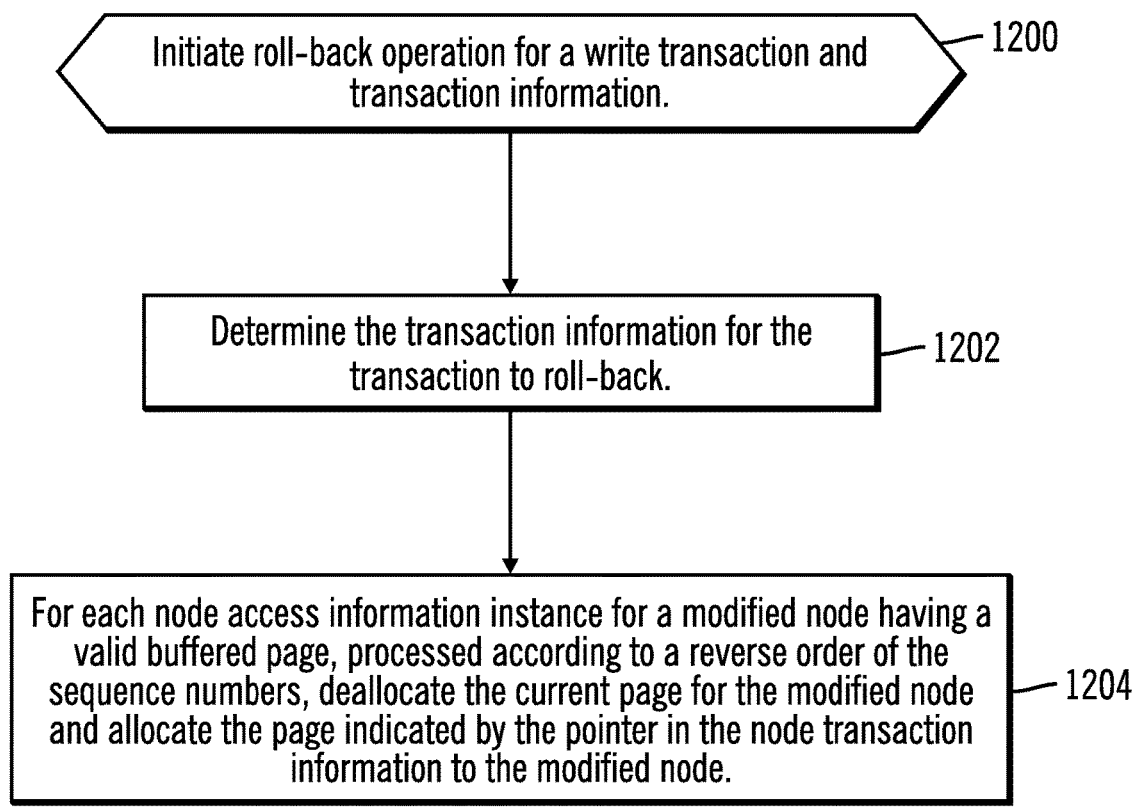
FIG. 12 illustrates an embodiment of operations to roll back a write transaction.

FIG. 12 illustrates an embodiment of operations performed by the data set memory manager 114, or other component, to roll back a write transaction $122_W$. The roll-back operation may be initiated in response to a user request if a write transaction fails or to reverse or recover data inadvertently overwritten. The user may specify the write transaction $122_W$ and associated transaction information $700_W$ to roll back. Alternatively, the roll-back operation may automatically occur in response to the write transaction failing. Upon initiating (at block 1200) the roll-back operation, the data set memory manager 114 determines (at block 1202) the transaction information $700_W$ for the transaction $122_W$ to roll back. For each node access information instance $800_i$ for a modified node having a valid buffered page (e.g., with a page valid flag 814 indicating valid), processed according to a reverse order of the sequence numbers 802 of the node access information, the data set memory manager 114 deallocates (at block 1204) the current page for the modified node and allocates the page indicated by the pointer 812 in the node transaction information to the modified node to return the node to the pre-transaction state.

With the described operations of FIG. 12, a write transaction may be rolled back by replacing the current pages for modified nodes in the data set index 400 with the page indicated by the pointer 812 for those node access information instances $800_i$ having the valid flag 814 indicating a valid previous version of a page $116_i$ for the node.

In further embodiments, the transaction information $700_i$ may be used to determine whether to commit a page and write to memory. If one transaction completes, before committing modified pages for nodes in the memory 108 to the storage 104, the data set memory manager 114 may process transaction information $700_i$ as indicated in the data set transaction list $120_i$ for the data set to which the page is allocated to determine whether the transaction information $700_i$ for any other open transactions have node access information $800_i$ for the node allocated the page being considered to commit. In such case, that other transactions are performing operations with respect to the node allocated the page being considered for commit, the commit of that page may be delayed until there are no more open transactions processing the node allocated the page to commit. This deferral of the commit streamlines operations by avoiding have to perform another read after the commit to access the page from the storage 104 when another open transaction accesses that page to access the node implemented in that page. Deferring commit until all open transactions accessing the node implemented in that page have completed reduces the need to stage the page for the node back into memory 108 after the page for the node is committed and destaged to the storage 104

Described embodiments provide techniques to gather history information on node accesses during a read or write transaction by generating, in transaction information, node access information for accessed nodes comprising nodes in the tree data structure accessed as part of processing the transaction. The node access information includes a pointer to the page allocated to the accessed node prior to the transaction in response to the node being modified during the transaction. The transaction information may be used to analyze failed read or write transactions or roll-back a write transaction.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 13:
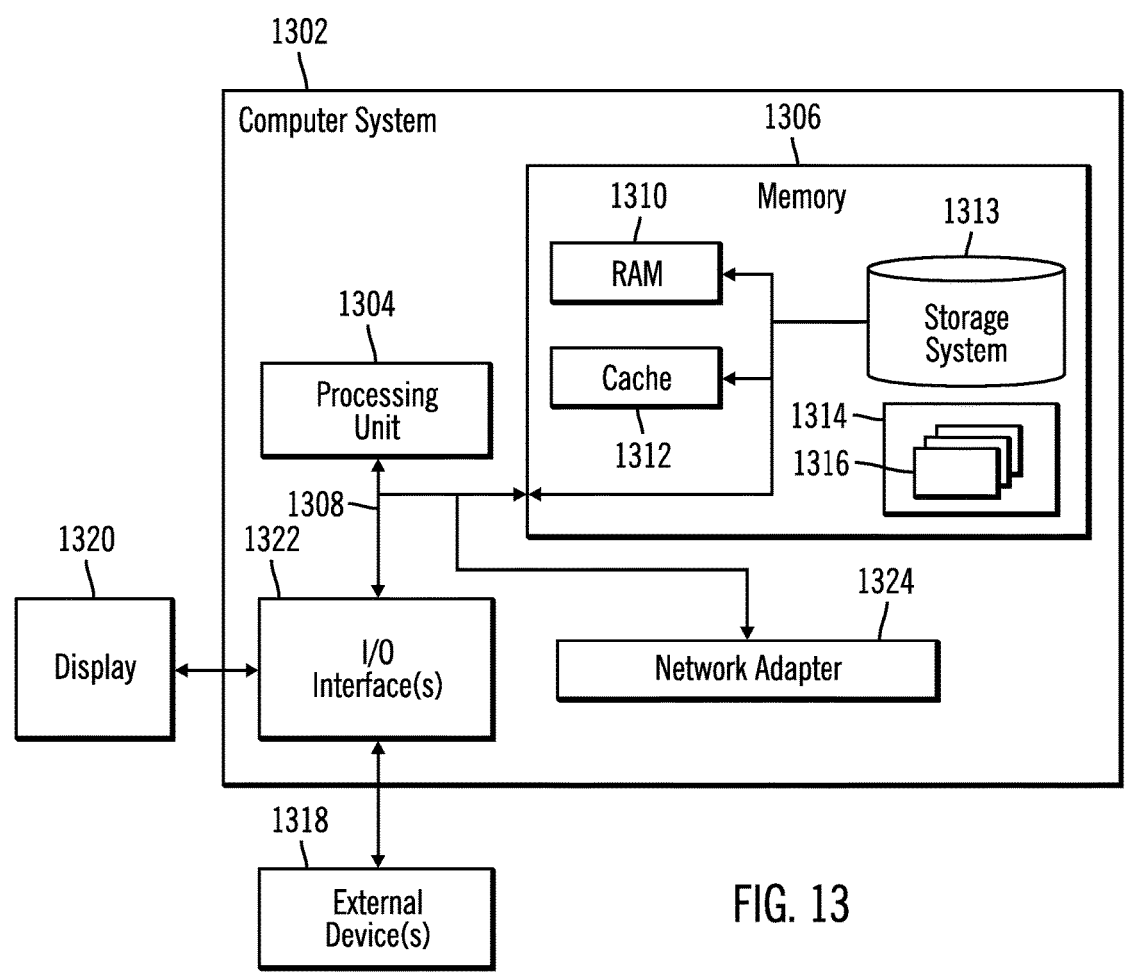
FIG. 13 illustrates an embodiment of an implementation of a computing system.

The server 100 of FIG. 1 may be implemented in one or more computer systems, such as the computer system 1302 shown in FIG. 13. Computer system/server 1302 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, the computer system/server 1302 is shown in the form of a general-purpose computing device. The components of computer system/server 1302 may include, but are not limited to, one or more processors or processing units 1304, a system memory 1306, and a bus 1308 that couples various system components including system memory 1306 to processor 1304. Bus 1308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1302 typically includes a variety of computer system readable media. Such media may be any available media that is accessible by computer system/server 1302, and it includes both volatile and non-volatile media, removable and non-removable media.

System memory 1306 can include computer system readable media in the form of volatile memory, such as random access memory (RAM) 1310 and/or cache memory 1312. Computer system/server 1302 may further include other removable/non-removable, volatile/non-volatile computer system storage media. By way of example only, storage system 1313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1308 by one or more data media interfaces. As will be further depicted and described below, memory 1306 may include at least one program product having a set (e.g., at least one) of program modules that are configured to carry out the functions of embodiments of the invention.

Program/utility 1314, having a set (at least one) of program modules 1316, may be stored in memory 1306 by way of example, and not limitation, as well as an operating system, one or more application programs, other program modules, and program data. Each of the operating system, one or more application programs, other program modules, and program data or some combination thereof, may include an implementation of a networking environment. The components of the computer 1302 may be implemented as program modules 1316 which generally carry out the functions and/or methodologies of embodiments of the invention as described herein. The systems of FIG. 1 may be implemented in one or more computer systems 1302, where if they are implemented in multiple computer systems 1302, then the computer systems may communicate over a network.

Computer system/server 1302 may also communicate with one or more external devices 1318 such as a keyboard, a pointing device, a display 1320, etc.; one or more devices that enable a user to interact with computer system/server 1302; and/or any devices (e.g., network card, modem, etc.) that enable computer system/server 1302 to communicate with one or more other computing devices. Such communication can occur via Input/Output (I/O) interfaces 1322. Still yet, computer system/server 1302 can communicate with one or more networks such as a local area network (LAN), a general wide area network (WAN), and/or a public network (e.g., the Internet) via network adapter 1324. As depicted, network adapter 1324 communicates with the other components of computer system/server 1302 via bus 1308. It should be understood that although not shown, other hardware and/or software components could be used in conjunction with computer system/server 1302. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for maintaining information on pages in a memory used for data in a data set stored in a storage, the computer program product comprising a computer readable storage medium having computer readable program code embodied therein that executes to perform operations, the operations comprising:

allocating pages in the memory to internal nodes and leaf nodes of a tree data structure representing all or a portion of a data set index for the data set, wherein the leaf nodes identify data set members and the internal nodes are used to traverse the tree data structure to access the leaf nodes;

processing a transaction with respect to the data set that involves accessing the internal and leaf nodes in the tree data structure, wherein the transaction comprises a read or write operation; and generating, in transaction information, node access information for accessed nodes comprising nodes in the tree data structure accessed as part of processing the transaction, wherein the node access information includes a pointer to the page allocated to the accessed node prior to the transaction in response to the node being modified during the transaction.

2. The computer program product of claim 1, wherein the transaction comprises a write operation, wherein the operations further comprise:

modifying a node processed as part of the transaction; and
allocating a new page for the modified node indicating a data set member having write data from the write operation.

3. The computer program product of claim 2, wherein the operations further comprise:

deallocating a page allocated to the modified node before the transaction to be available for reuse as an unallocated page;
initiating an operation to roll back the transaction;
deallocating the new page allocated to the modified node; and
allocating to the modified node the deallocated page indicated by the pointer in the node access information to return the modified node to a state prior to the transaction subject to the roll back.

4. The computer program product of claim 1, wherein the operations further comprise:

modifying a node processed as part of the transaction;
deallocating a page allocated to the modified node before the transaction to be available for reuse as an unallocated page; and
indicating in the node access information for the modified node that the deallocated page indicated by the pointer in the node access information is invalid in response to the deallocated page being invalidated in the memory.

5. The computer program product of claim 4, wherein the operations further comprise:

maintaining data set transaction information indicating transaction information for different transactions and data sets subject to the transactions;
receiving notification indicating a page allocated to a subject data set being invalidated or freed; and
determining a node access information instance in the transaction information for the subject data set having a pointer to the page indicated in the notification, wherein the indicating in the node access information that the deallocated page indicated by the pointer is invalid is performed for determined node access information.

6. The computer program product of claim 4, wherein pointers in node access information instances in the transaction information for a plurality of modified nodes point to deallocated pages comprising unallocated pages in the memory, wherein the operations further comprise:
  determining whether all of the deallocated pages addressed by the pointers in the node access information in the transaction information are freed or invalidated; and
  indicating the transaction information and the node access information for the transaction information as invalid in response to determining that the deallocated pages addressed by the pointers are freed or are invalidated.

7. The computer program product of claim 1, wherein the transaction comprises a read operation, wherein the operations further comprise:
  indicating the transaction information and the node access information as invalid in response to completing the read operation.

8. The computer program product of claim 1, wherein the node access information for each node of the nodes accessed during the transaction indicates a sequence number indicating an order in which the node was accessed during the transaction, a timestamp for the access of the node, and a type of the access of the page of the node during the transaction.

9. The computer program product of claim 1, wherein the operations further comprise:
  using the transaction information including the node access information to diagnose the transaction in response to the transaction failing.

10. The computer program product of claim 1, wherein the node access information for an accessed node is generated when the accessed node is accessed as part of processing the transaction, wherein the transaction information logs node access information for all node processing from when the transaction is opened until the transaction is closed.

11. The computer program product of claim 1, wherein the operations further comprise:
  initiating an operation to commit a page allocated to a node accessed by a completed transaction;
  determining whether one instance of transaction information for one pending transaction includes node access information for the node allocated to the page to commit; and
  committing the page to commit after determining that no transaction information for a transaction includes node access information for the node allocated the page to commit.

12. A system in communication with a storage, comprising:
  a processor;
  a memory having pages used for data in a data set stored in the storage;
  computer readable program code in the memory executed by the processor to perform operations, the operations comprising:
    allocating pages in the memory to internal nodes and leaf nodes of a tree data structure representing all or a portion of a data set index for the data set, wherein the leaf nodes identify data set members and the internal nodes are used to traverse the tree data structure to access the leaf nodes;
    processing a transaction with respect to the data set that involves accessing the internal and leaf nodes in the tree data structure, wherein the transaction comprises a read or write operation; and
    generating, in transaction information, node access information for accessed nodes comprising nodes in the tree data structure accessed as part of processing the transaction, wherein the node access information includes a pointer to the page allocated to the accessed node prior to the transaction in response to the node being modified during the transaction.

13. The system of claim 12, wherein the operations further comprise:
  modifying a node processed as part of the transaction;
  deallocating a page allocated to the modified node before the transaction to be available for reuse as an unallocated page;
  initiating an operation to roll back the transaction;
  deallocating a new page allocated to the modified node; and
  allocating to the modified node the deallocated page indicated by the pointer in the node access information to return the modified node to a state prior to the transaction subject to the roll back.

14. The system of claim 12, wherein the operations further comprise:
  modifying a node processed as part of the transaction;
  deallocating a page allocated to the modified node before the transaction to be available for reuse as an unallocated page; and
  indicating in the node access information for the modified node that the deallocated page indicated by the pointer in the node access information is invalid in response to the deallocated page being invalidated in the memory.

15. The system of claim 14, wherein the operations further comprises:
  maintaining data set transaction information indicating transaction information for different transactions and data sets subject to the transactions;
  receiving notification indicating a page allocated to a subject data set being invalidated or freed; and
  determining a node access information instance in the transaction information for the subject data set having a pointer to the page indicated in the notification, wherein the indicating in the node access information that the deallocated page indicated by the pointer is invalid is performed for determined node access information.

16. The system of claim 12, wherein the node access information for an accessed node is generated when the accessed node is accessed as part of processing the transaction, wherein the transaction information logs node access information for all node processing from when the transaction is opened until the transaction is closed.

17. A method for maintaining information on pages in a memory used for data in a data set stored in a storage, comprising:
  allocating pages in the memory to internal nodes and leaf nodes of a tree data structure representing all or a portion of a data set index for the data set, wherein the leaf nodes identify data set members and the internal nodes are used to traverse the tree data structure to access the leaf nodes;
  processing a transaction with respect to the data set that involves accessing the internal and leaf nodes in the tree data structure, wherein the transaction comprises a read or write operation; and
  generating, in transaction information, node access information for accessed nodes comprising nodes in the tree data structure accessed as part of processing the transaction, wherein the node access information includes a pointer to the page allocated to the accessed node prior to the transaction in response to the node being modified during the transaction.

18. The method of claim 17, further comprising:

modifying a node processed as part of the transaction;

deallocating a page allocated to the modified node before the transaction to be available for reuse as an unallocated page;

initiating an operation to roll back the transaction;

deallocating a new page allocated to the modified node; and allocating to the modified node the deallocated page indicated by the pointer in the node access information to return the modified node to a state prior to the transaction subject to the roll back.

19. The method of claim 17, further comprising:

modifying a node processed as part of the transaction;

deallocating a page allocated to the modified node before the transaction to be available for reuse as an unallocated page; and indicating in the node access information for the modified node that the deallocated page indicated by the pointer in the node access information is invalid in response to the deallocated page being invalidated in the memory.

20. The method of claim 19, further comprising:

maintaining data set transaction information indicating transaction information for different transactions and data sets subject to the transactions;

receiving notification indicating a page allocated to a subject data set being invalidated or freed; and determining a node access information instance in the transaction information for the subject data set having a pointer to the page indicated in the notification, wherein the indicating in the node access information that the deallocated page indicated by the pointer is invalid is performed for determined node access information.

\* \* \* \* \*